(12) United States Patent
Yan et al.

(10) Patent No.: US 11,924,531 B2
(45) Date of Patent: Mar. 5, 2024

(54) RETRACTABLE CAMERA MODULE AND ELECTRONIC DEVICE

(71) Applicant: Changzhou AAC Raytech Optronics Co., Ltd., Changzhou (CN)

(72) Inventors: Feng Yan, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 80 days.

(21) Appl. No.: 17/835,954

(22) Filed: Jun. 8, 2022

(65) Prior Publication Data

US 2023/0269449 A1    Aug. 24, 2023

(30) Foreign Application Priority Data

Feb. 22, 2022  (CN) .......................... 202210164079.6

(51) Int. Cl.
*H04N 23/51*  (2023.01)
*H04N 23/55*  (2023.01)

(52) U.S. Cl.
CPC ............. *H04N 23/51* (2023.01); *H04N 23/55* (2023.01)

(58) Field of Classification Search
CPC ........ H04N 23/51; H04N 23/55; H04N 23/57; H04N 23/687; H04N 23/52; H04N 23/54; H04N 23/675; H04M 1/0235; H04M 1/0264; G03B 5/04; G03B 2205/0015; G03B 2205/0069; G03B 17/04; G03B 2205/0007; G03B 3/10; G03B 5/00; G03B 17/12; G03B 30/00; G02B 7/023; G02B 27/646; G02B 7/021; G02B 7/08; G02B 13/001

See application file for complete search history.

(56) References Cited

U.S. PATENT DOCUMENTS

| | | | | |
|---|---|---|---|---|
| 2018/0091716 | A1* | 3/2018 | Brand | H04M 1/72454 |
| 2019/0163242 | A1* | 5/2019 | Zeng | G06F 1/188 |
| 2020/0280663 | A1* | 9/2020 | Imai | H04N 23/51 |
| 2020/0288003 | A1* | 9/2020 | Zeng | H04N 23/54 |
| 2021/0064099 | A1* | 3/2021 | Yang | G03B 17/04 |
| 2021/0136188 | A1* | 5/2021 | Lei | H04M 1/72415 |
| 2021/0136284 | A1* | 5/2021 | Gopalakrishna | H04N 23/75 |
| 2022/0086344 | A1* | 3/2022 | Jun | H04N 23/45 |
| 2023/0194960 | A1* | 6/2023 | Yedid | G03B 5/00 |
| | | | | 396/349 |

* cited by examiner

*Primary Examiner* — Lin Ye
*Assistant Examiner* — Tuan H Le
(74) *Attorney, Agent, or Firm* — W&G Law Group (57) ABSTRACT

The present invention provides a retractable camera module, including a housing, a lens assembly, a support assembly, a driving assembly, and an exterior part covered on the housing. A bulge portion is arranged on an outer wall of a top plate in the housing; a first groove matched with the bulge portion is formed in an inner wall of the exterior part; the support assembly includes a lifting plate connected to the lens assembly, a guide rod penetrating through the lifting plate and fixedly connected between the bulge portion and a bottom plate, and at least two elastic members elastically connected between the lifting plate and the bottom plate. the present invention provides a retractable camera module which occupies a small space and can ensure the extending and retracting steadiness and achieves better optical characteristics.

10 Claims, 14 Drawing Sheets

RETRACTABLE CAMERA MODULE AND ELECTRONIC DEVICE

TECHNICAL FIELD

The present invention relates to the technical field of electronic devices, in particular to a retractable camera module and an electronic device.

BACKGROUND

At present, electronic devices such as mobile phones tend to be ultra-thin, so that higher requirements are put forward to a retractable camera module in an ultra-thin electronic device. However, the retractable camera module of the related art cannot balance the size and functions. General retractable camera modules cannot be designed to be extremely small.

Therefore, it is necessary to provide a new retractable camera module for solving the above technical problem.

SUMMARY

The present invention aims to provide a retractable camera module which occupies a small space and can ensure the extending and retracting steadiness.

The technical solution of the present invention is as follows:

A retractable camera module includes a housing with a receiving space; a lens assembly at least partially received in the housing; a support assembly received in the housing and configured for supporting the lens assembly; a driving assembly arranged on one side of the lens assembly; and an exterior part covered on the housing, wherein the housing includes a bottom plate and a cover body covered on the bottom plate; the cover body includes a top plate provided with an opening, and a circumferential side plate extending in a bent manner from the top plate to the bottom plate; a bulge portion is arranged on an outer wall of the top plate;

a window corresponding to the opening in the top plate is formed in the exterior part, and a first groove matched with the bulge portion is formed in an inner wall of the exterior part;

the support assembly includes a lifting plate connected to one side of the lens assembly close to the bottom plate, a guide rod penetrating through the lifting plate and fixedly connected between the bulge portion and the bottom plate, and at least two elastic members elastically connected between the lifting plate and the bottom plate; the lifting plate is fixed with a guide ring; the guide rod is slidably connected to the lifting plate through the guide ring; the at least two elastic members are distributed on two sides of the guide rod;

the driving assembly includes a driving unit assembled to the housing, and a mobile plate with one end connected to the driving unit and the other end fixedly connected to the guide ring; the mobile plate is located on one side of the lifting plate close to the top plate; and the driving unit is configured for driving the mobile plate to move along a height direction of the housing, so that the lifting plate drives the lens assembly for extending out of or retracting to the cover body via the opening.

Preferably, there are two elastic members respectively located on one side of the guide rod away from the lens assembly and one side of the lens assembly away from the guide rod; and the guide rod and the two elastic members are located on one symmetry axis of the lens assembly.

Preferably, the support assembly further includes guide shafts sleeved inside the elastic members, and guide sleeves sleeved on the guide shafts; the guide shafts penetrate through the lifting plate and are fixedly connected between the top plate and the bottom plate; and the guide sleeves are fixedly connected to one end of each elastic member close to the lifting plate.

Preferably, gaps are reserved between inner walls of each guide sleeve located on two sides of a connecting line of the two guide sleeves and each corresponding guide shaft; and inner walls of each guide sleeve located on two sides in a direction perpendicular to the connecting line of the two guide sleeves and each corresponding guide shaft are in microclearance fit.

Preferably, the driving assembly further includes a transmission rod disposed along the height direction of the housing; one end of the transmission rod is connected to the driving unit; the mobile plate is sleeved on the transmission rod and is in threaded connection with the transmission rod; one end of the mobile plate is provided with a bulge portion along a plane direction where the mobile plate is located; a second groove is arranged on an inner wall of the circumferential side plate along the height direction of the housing; and the second groove is matched with the bulge portion.

Preferably, the driving assembly further includes a gear set containing at least two gears; and one end of the transmission rod is connected to the driving unit through the gear set.

Preferably, an outer wall of one end of the guide ring close to the top plate outwardly extends along an annular direction of the guide ring to form an extension portion; the extension portion is located on one side of the lifting plate close to the top plate; and the mobile plate is sleeved on the guide ring and is fixedly connected to one side of the extension portion away from the lifting plate.

Preferably, an annular groove is formed in the inner wall of the exterior part; a sealing ring is fixed in the annular groove; and an inner ring of the sealing ring is elastically connected to a circumferential side surface of the lens assembly.

In another aspect, the present invention further provides an electronic device, including a screen, a back cover covered on one surface of the screen, and the above-mentioned retractable camera module; and the retractable camera module is embedded on the back cover.

Preferably, the exterior part is covered on an outer wall of the top plate and protrudes from an outer wall of the back cover; and when the retractable camera module is in a retracted state, the lens assembly does not protrude from the outer wall of the back cover.

The present invention has the beneficial effects: By the design of the exterior part, the first groove and the bulge portion are designed for matching the exterior part with the housing, thus ensuring that the retractable camera module has a smaller shoulder height and enabling the lens assembly for having a larger moving stroke and a guide length. The guide ring and the guide rod are arranged to cooperate with each other to achieve guidance, and the elastic members are arranged on the two sides of the guide rod, so that tilt caused by an unbalanced stress in an operating process is effectively relieved; the steadiness of extension of the lens assembly is guaranteed; and better optical characteristics are achieved.

DETAILED DESCRIPTION OF THE EMBODIMENTS

The present invention is further described below in combination with the accompanying drawings and implementation modes.

An electronic device provided in an embodiment of the present invention includes, but is not limited to, a mobile phone, a telephone, a television set, a flat computer, a notebook computer, a laptop, a desk computer, a camera, a vehicle-mounted device, a wearable device, and the like. In the embodiments of the present invention, a mobile phone is taken as an example for specific illustration.

Figure 1:
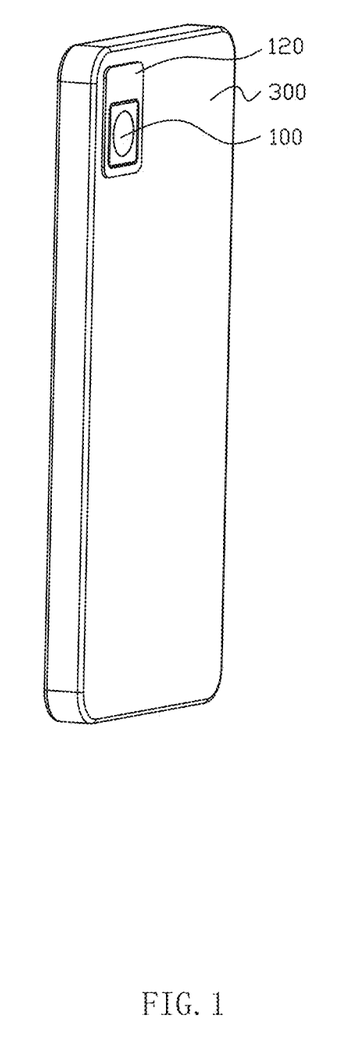
FIG. 1 is a schematic structural diagram of a retractable camera module of an electronic device provided in an embodiment of the present invention in a retracted state.
Figure 2:
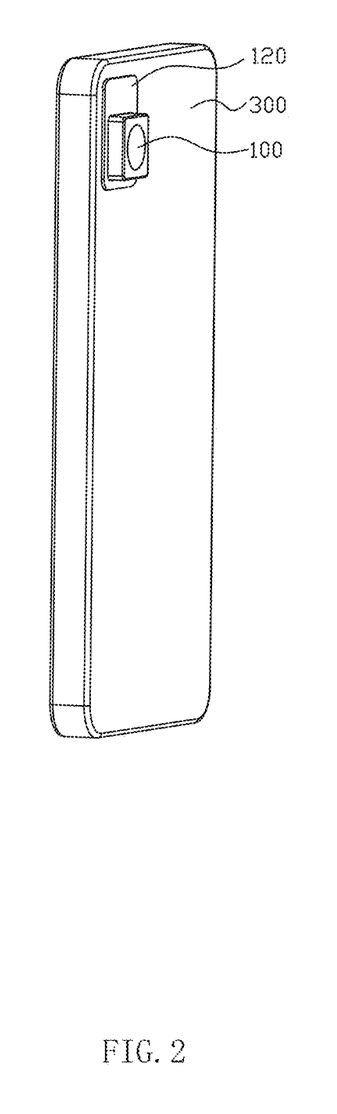
FIG. 2 is a schematic structural diagram of a retractable camera module of an electronic device provided in an embodiment of the present invention in an extended state.
Figure 3:
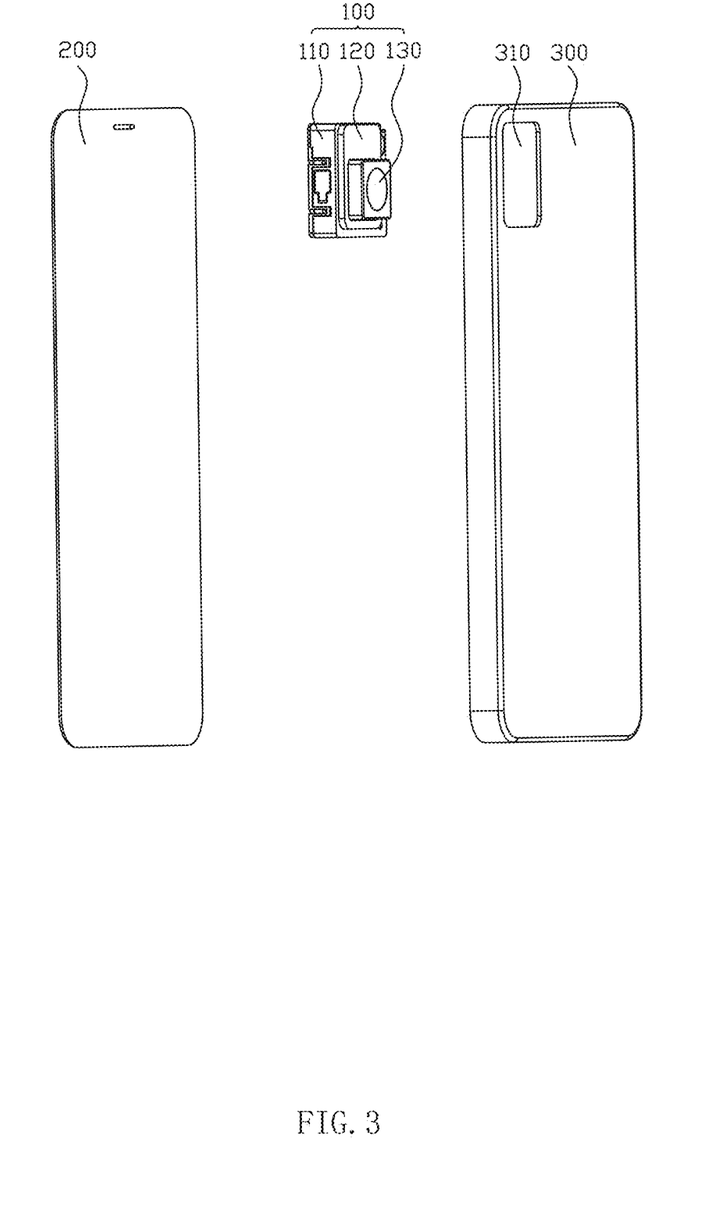
FIG. 3 is an exploded schematic structural diagram of an electronic device provided in an embodiment of the present invention.

The present invention provides an electronic device with a rear-mounted camera. Referring to FIG. 1 to FIG. 3, the electronic device includes a screen 200, a back cover 300, and a retractable camera module 100. Specifically, the back cover 300 is covered on one surface of the screen 200 and is enclosed with the screen 200 to form a cuboid or nearly cuboid structure. The back cover 300 can be covered on the screen 200 in a manner of bonding, welding, clamping, or the like. The back cover 300 is provided with a through hole 310, and the retractable camera module 100 is embedded in the through hole 310 and can pass through the through hole 310 for extension and retraction. FIG. 1 is a schematic structural diagram of a retractable camera module 100 in a retracted state, and FIG. 2 is a schematic structural diagram of a retractable camera module 100 in an extended state.

Referring to FIG. 1 to FIG. 3, the retractable camera module 100 includes a housing 110, an exterior part 120, a lens assembly 130, a support assembly 140, and a driving assembly 150.

Figure 6:
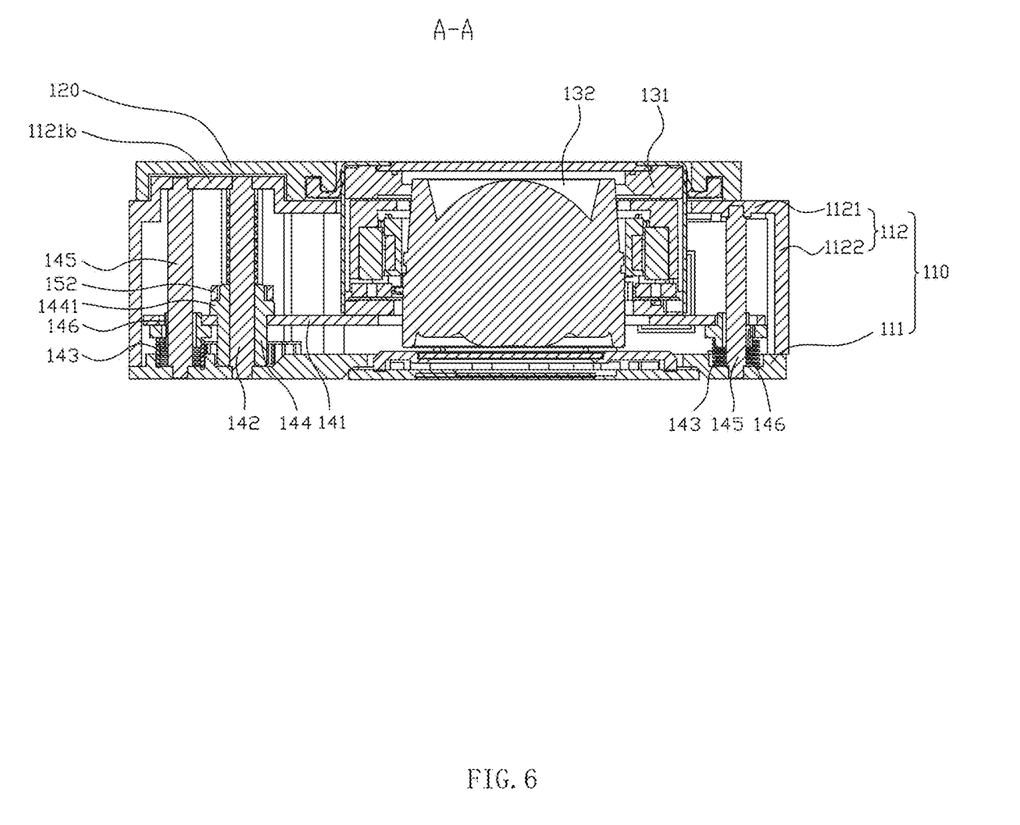
FIG. 6 is a sectional view of a retractable camera module provided in an embodiment of the present invention along a direction A-A.
Figure 7:
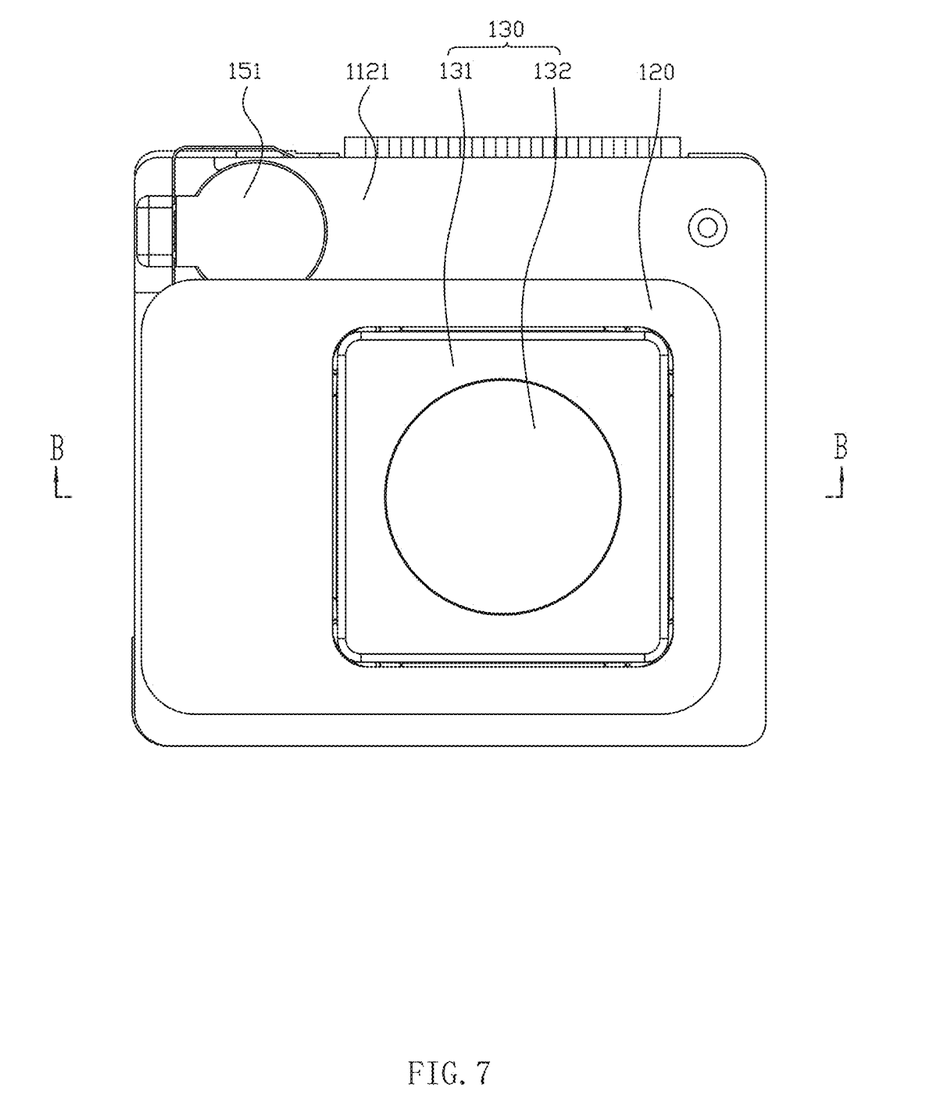
FIG. 7 is a top view of a retractable camera module provided in an embodiment of the present invention in an extended state.
Figure 9:
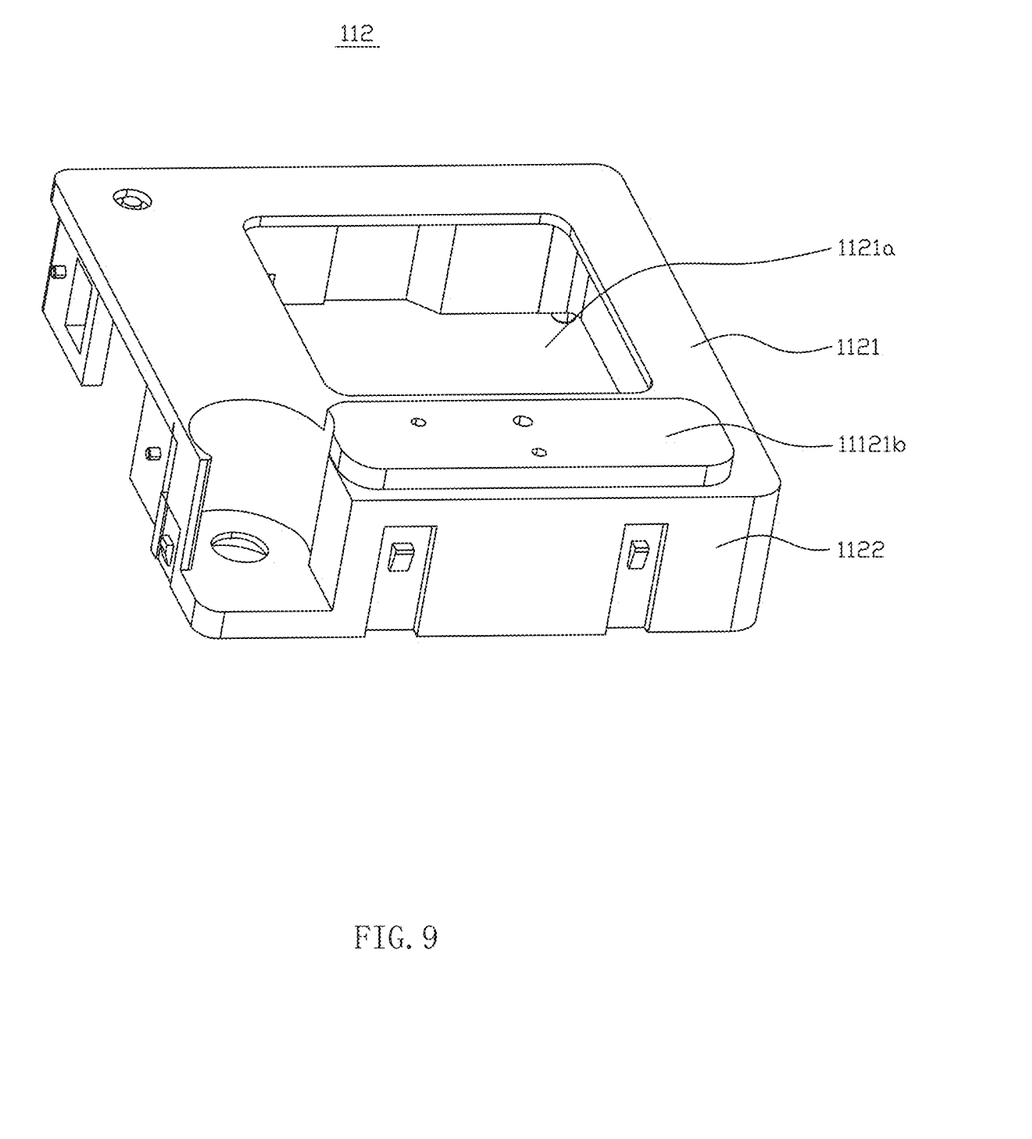
FIG. 9 is a schematic three-dimensional structural diagram of a cover body provided in an embodiment of the present invention.
Figure 10:
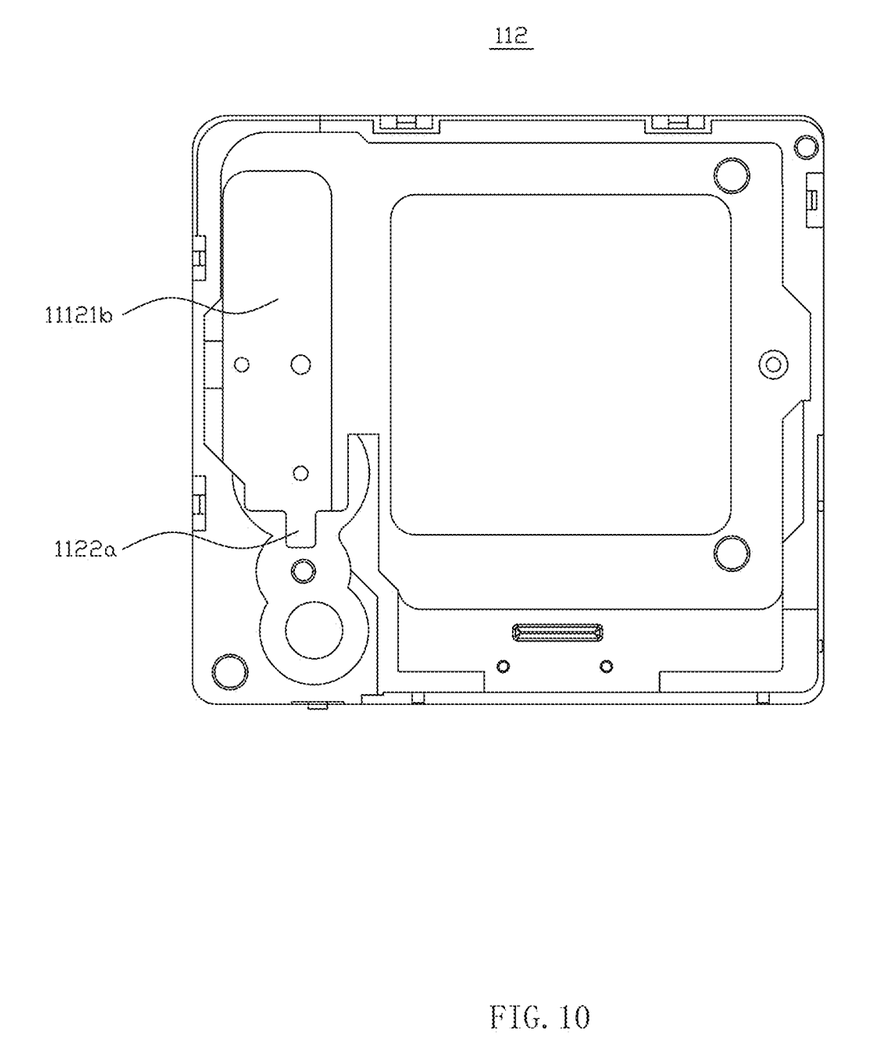
FIG. 10 is a bottom view of a cover body provided in an embodiment of the present invention.

In combination with FIG. 6, FIG. 9, and FIG. 10, the housing 110 includes a bottom plate 111, and a cover body 112 covered on the bottom plate 111. The cover body 112 includes a top plate 1121 and a circumferential side plate 1122. The top plate 1121 is provided with an opening 1121a, and a bulge portion 1121b is arranged on an outer wall of the top plate 1121. The bulge portion 1121b may be rectangular, and the circumferential side plate 1122 extends in a bent manner from the top plate 1121 to the bottom plate 111. The top plate 1121 and the circumferential side plate 1122 can be integrally formed, and the circumferential side plate 1122 can be fixedly connected to the bottom plate 111 by means of clamping, screwing or the like.

Figure 11:
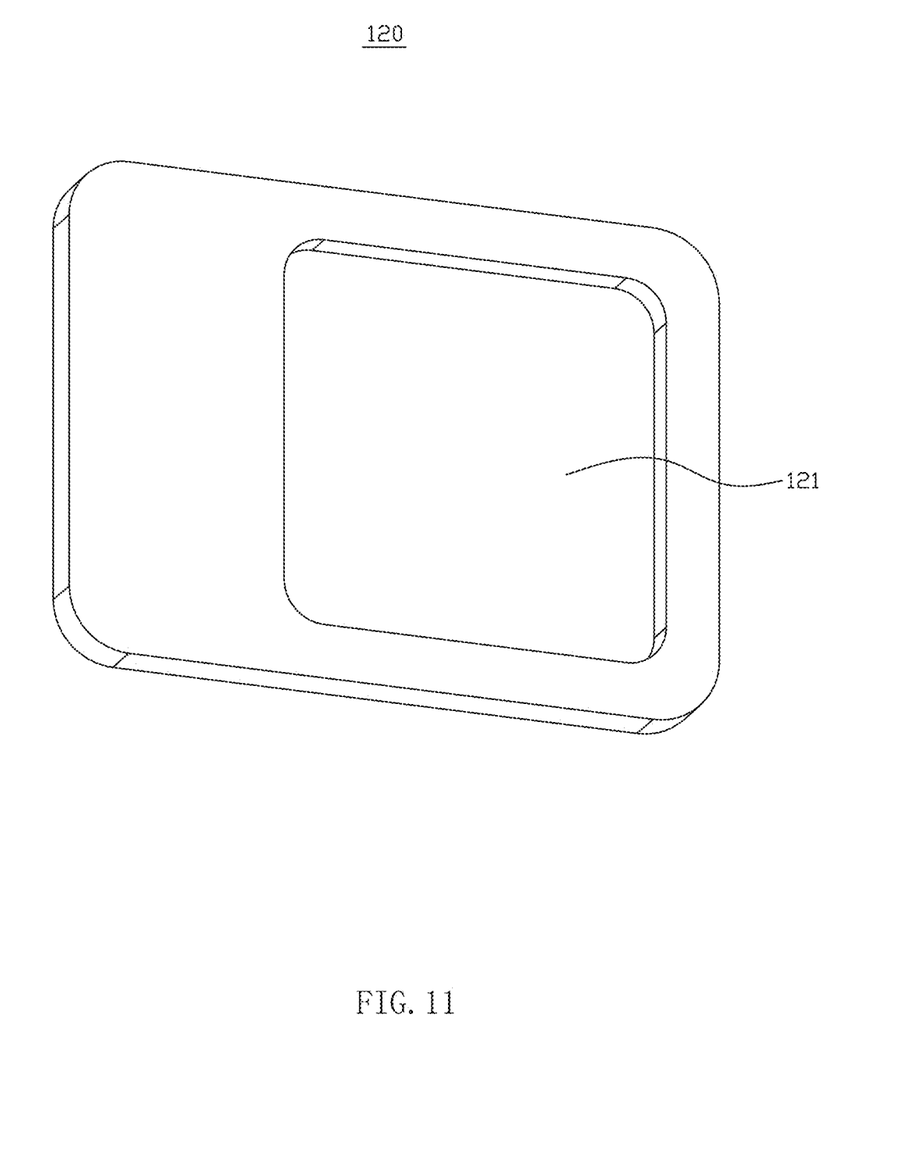
FIG. 11 is a schematic three-dimensional structural diagram of an exterior part provided in an embodiment of the present invention at one view angle.
Figure 12:
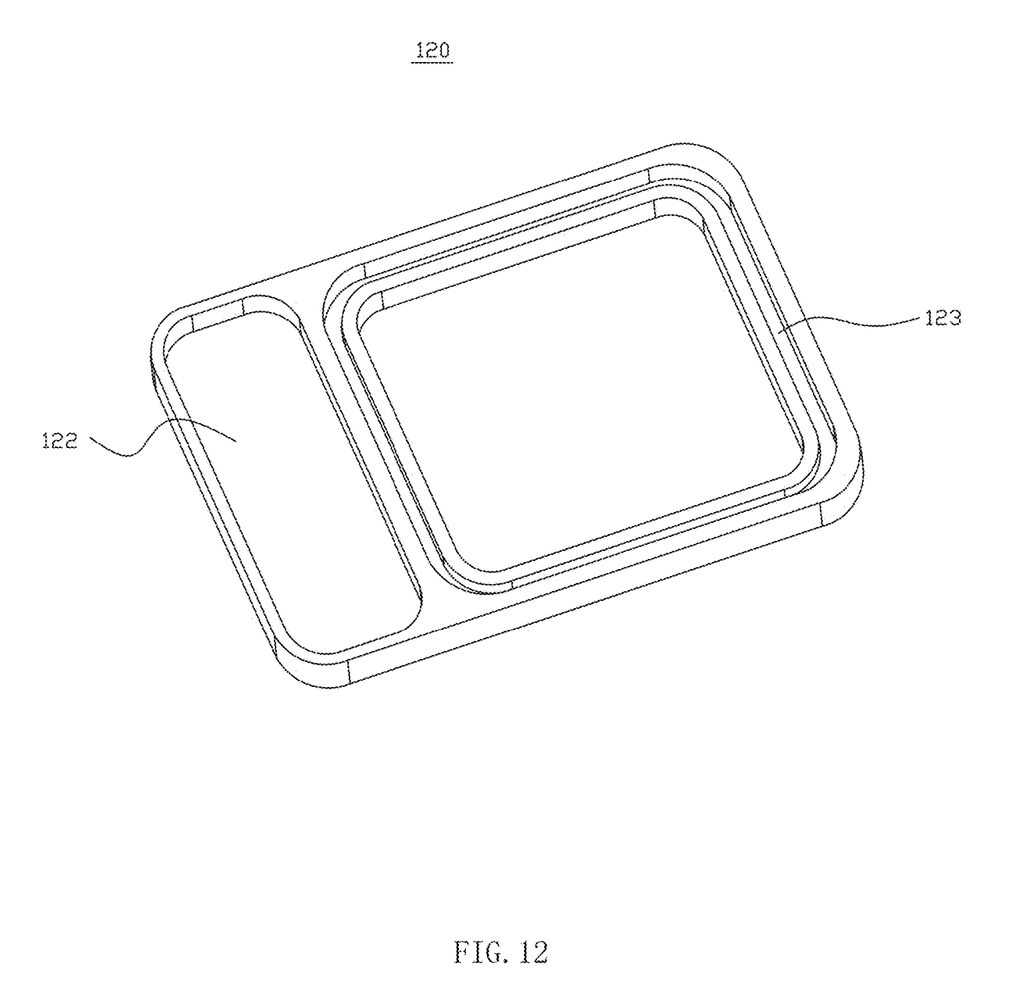
FIG. 12 is a schematic three-dimensional structural diagram of an exterior part provided in an embodiment of the present invention at another view angle.

Referring to FIG. 6, FIG. 11, and FIG. 12, the exterior part 120 is covered on the outer wall of the top plate 1121 and protrudes from an outer surface of the back cover 300. A window 121 is formed in the exterior part 120, and the window 121 corresponds to the opening 1121a in the top plate 1121, so that the lens assembly 130 can pass through the opening 1121a and the window 121 in sequence for extension. A first groove 122 is formed in an inner wall of the exterior part 120. The first groove 122 is configured for receiving the bulge portion 1121b matched with it. A back surface of the first groove 122 can be configured for adding a product Logo or identifier to a pleasant visual effect. The exterior part 120 is preferably made of a metal material such as aluminum alloy and stainless steel, so as for improving the appearance, aesthetic feeling and the structural strength of the mobile phone.

Referring to FIG. 5 to FIG. 8, the lens assembly 130 is partially received in the housing 110. Preferably, when the lens assembly 130 is in a retracted state, the retractable camera module 100 can be completely received in the mobile phone, that is, a side of the lens assembly 130 close to the top plate 1121 does not protrude from an outer wall of the exterior part 120, so that the appearance of the mobile phone looks more beautiful, and the application is more extensive. The lens assembly 130 may include an optical steady motor 131, and a lens 132 mounted to the optical steady motor 131, so that the lens assembly 130 has an optical steady function, and image unsteadiness caused by external vibration or hand tremble of a user is relieved.

Figure 4:
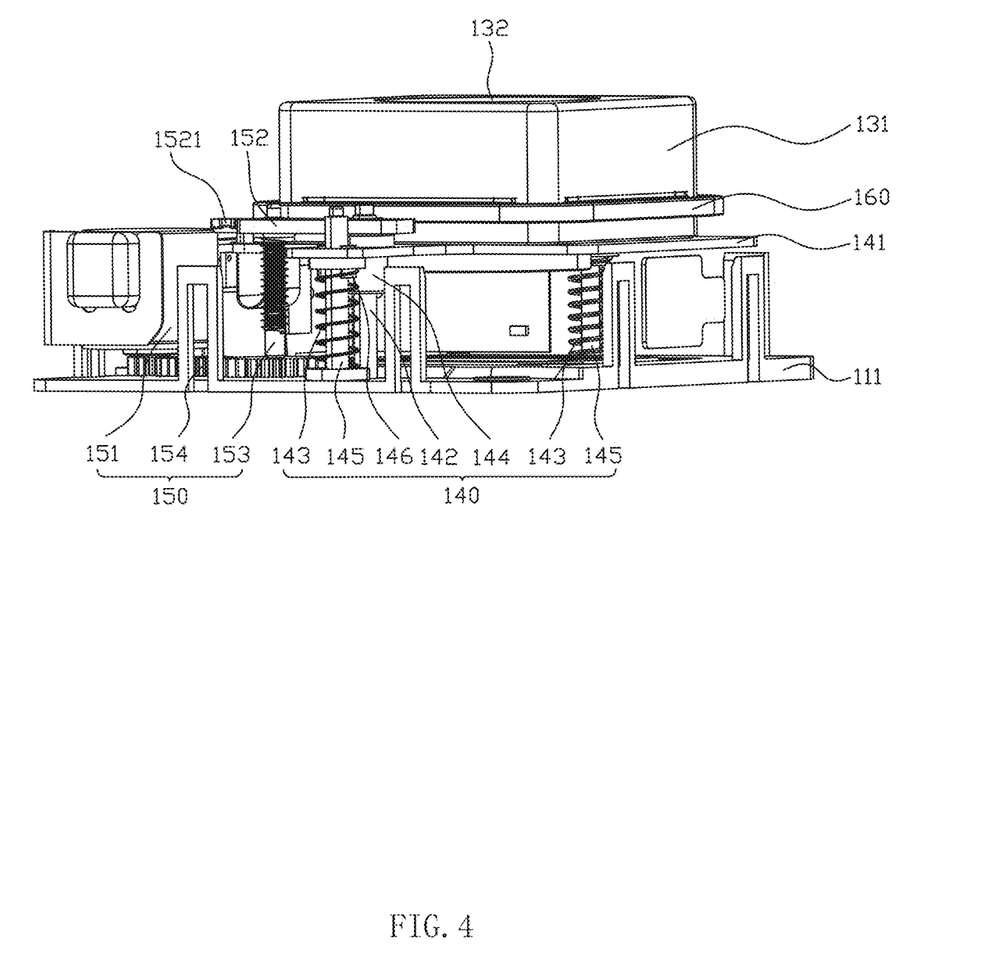
FIG. 4 is a schematic three-dimensional structural diagram of a retractable camera module without a housing and an exterior part provided in an embodiment of the present invention.
Figure 5:
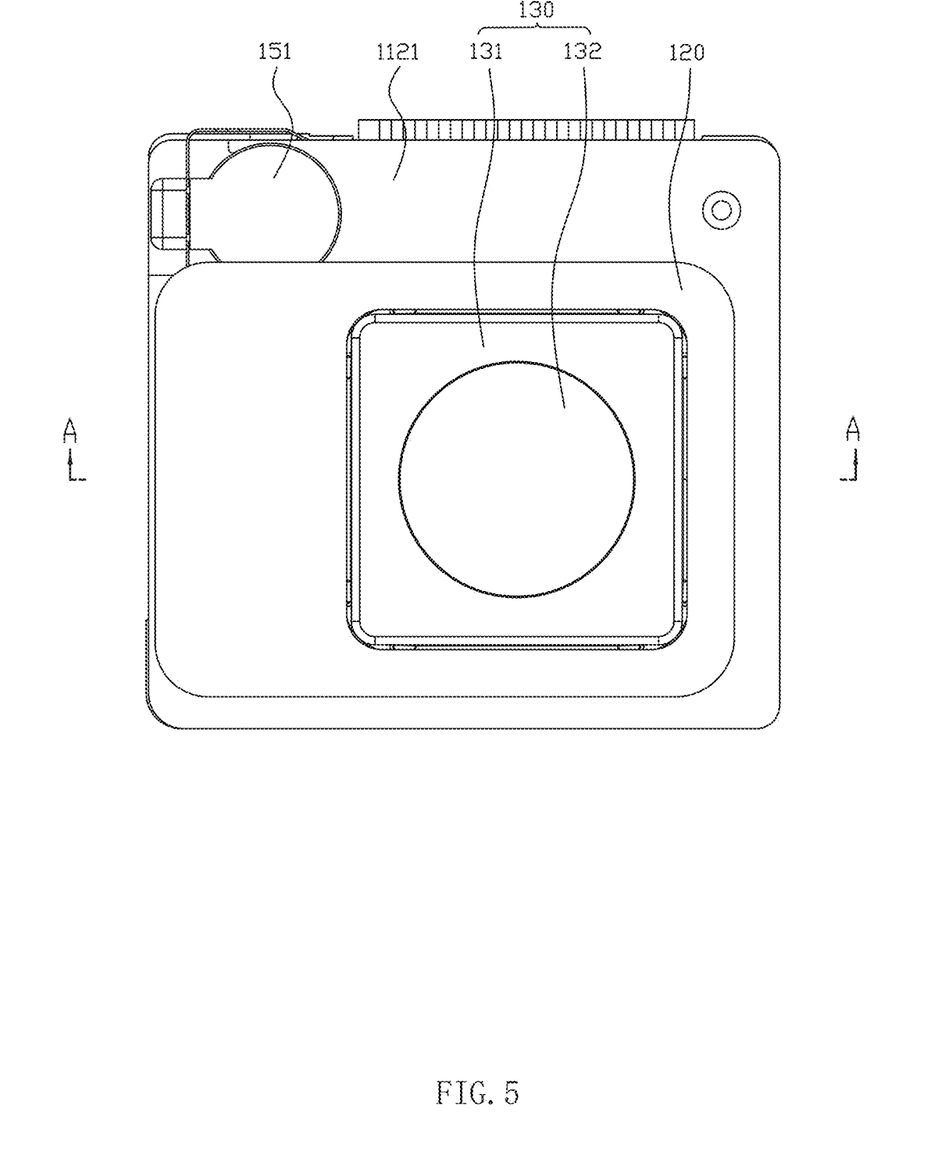
FIG. 5 is a top view of a retractable camera module provided in an embodiment of the present invention in a retracted state.

Referring to FIG. 4, the support assembly 140 includes a lifting plate 141, a guide rod 142, elastic members 143, and a guide ring 144. Specifically, the lifting plate 141 is connected to a side of the lens assembly 130 close to the bottom plate 111 for supporting the lens assembly 130. Furthermore, a hole may be formed in the lifting plate 141, so that it is convenient for the lens 132 to pass through the hole in the lifting plate 141 in a stabilization process. The guide rod 142 penetrates through the lifting plate 141 and is fixedly connected between the top plate 1121 and the bottom plate 111. The lifting plate 141 is fixed with the guide ring 144, and the guide rod 142 is slidably connected to the lifting plate 141 through the guide ring 144, so that the lifting plate 141 can drive the lens assembly 130 to move along an axial direction of the guide rod 142. Preferably, the guide ring 144 and the guide rod 142 are in microclearance fit, so as to guarantee the transmission accuracy. The guide ring 144 is made of a metal material such as copper, and is combined with the lifting plate 141 through a riveting process, so as to guarantee the structural strength. In this embodiment, the guide ring 144 may be a bearing. The elastic members 143 are elastically connected between the lifting plate 141 and the bottom plate 111. The elastic member 143 may specifically be a spring. For ensuring the steadiness of the lens assembly 130 in extending and retracting processes, at least two elastic members 143 are designed, a plurality of elastic members 143 are distributed on two sides of the guide rod 142. When it is ensured that the lens assembly 130 steadily extends and retracts, for simplifying the internal structure of the retractable camera module 100, only two elastic members 143 can be disposed. One elastic member 143 is located on one side of the guide rod 142 away from the lens assembly 130, and the other elastic member 143 is located on one side of the lens assembly 130 away from the guide rod 142. At the same time, the guide rod 142 and the two elastic members 143 are located on one symmetry axis of the lens assembly 130.

Figure 8:
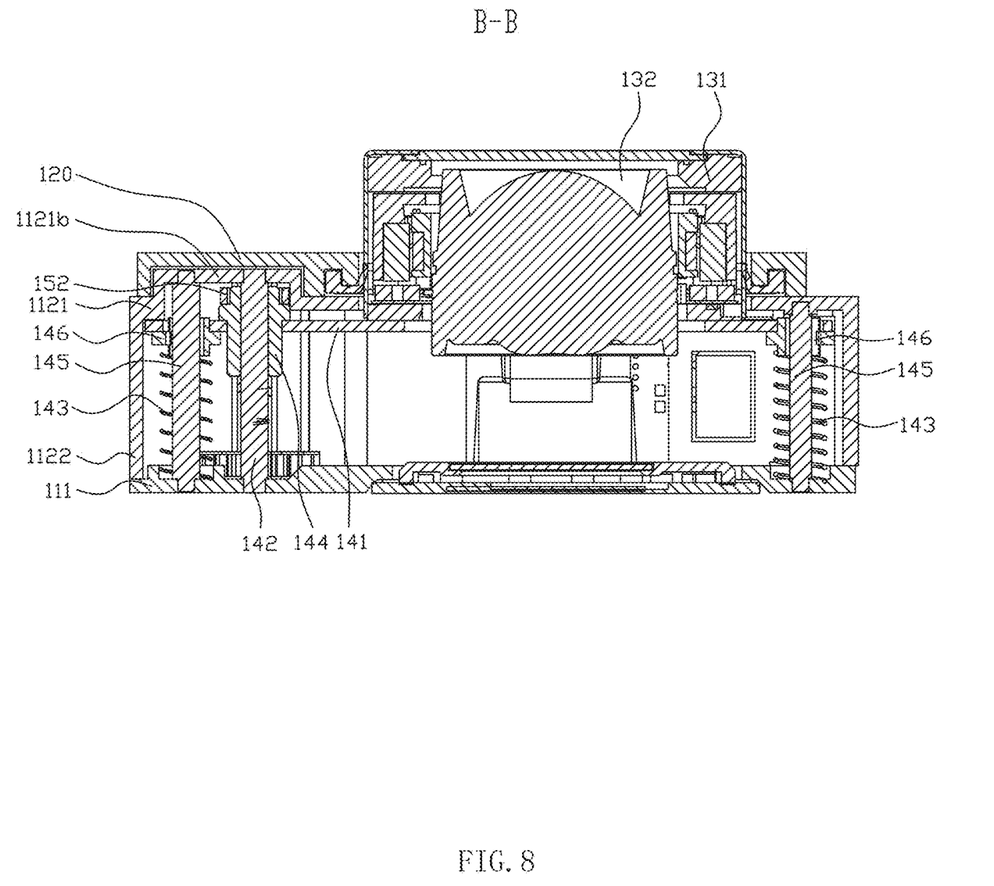
FIG. 8 is a sectional view of a retractable camera module provided in an embodiment of the present invention along a direction B-B.

In combination with FIG. 4, FIG. 6, and FIG. 8, as a preference, the support assembly 140 further includes guide shafts 145 and guide sleeves 146. The guide shafts 145 are sleeved inside the elastic members 143, penetrate through the lifting plate 141, and are fixedly connected between the top plate 1121 and the bottom plate 111. The guide sleeves 146 are sleeved on the guide shafts 145, and are fixed at one end of each elastic member 143 close to the lifting plate 141. Preferably, gaps are reserved between inner walls of each guide sleeve 146 located on two sides of a connecting line of the two guide sleeves 146 and each corresponding guide shaft 145, thus ensuring smooth transmission and avoiding self-locking; and inner walls of each guide sleeve 146 located on two sides in a direction perpendicular to the connecting line of the two guide sleeves 146 and each corresponding guide shaft 145 are in microclearance fit, thus preventing planar rotation of the lens assembly 130 and the lifting plate 141. In this embodiment, no limitation is made to the specific size of the gap between the guide sleeve 146 and the guide shaft 145. The guide sleeve 146 is preferably made of self-lubricating material such as polyformaldehyde (POM).

Referring to FIG. 6 and FIG. 8, one end of the guide rod 142 away from the bottom plate 111 and one end, away from the bottom plate 111, of the guide shaft 145 located on one side of the guide rod 142 away from the lens assembly 130 (i.e., the guide shaft 145 closer to the guide rod 142) are both connected to the bulge portion 1121. In such a design, in case of guaranteeing a smaller shoulder height, the extending and retracting movement stroke of the lens assembly 130 is increased. According to a focal length of the lens 132 and an optical performance requirement, if a movement distance is longer, the application is more extensive. A guide length can be appropriately prolonged, that is, the height of the guide ring 144 is increased. A greater guide length indicates steadier transmission, and the impact resistance of the structure is improved, thus improving the product reliability and the product performance (relieving the dynamic tilt in the motion process). At the same time, mounting holes will be formed in joints between the bulge portion 1121*b* and the guide rod 142 as well as the guide shafts 145, so that the exterior part 120 with the first groove 122 is covered on the bulge portion 1121*b*, which is conductive to sealing the mounting holes and ensuring the integrity and leakproofness of the structure.

Referring to FIG. 4, the driving assembly 150 includes a driving unit 151 and a mobile plate 152. The driving unit 151 is assembled to the housing 110; one end of the mobile plate 152 is connected to the driving unit 151, and the other end is fixedly connected to the guide ring 144. The mobile plate 152 is located on one side of the lifting plate 141 close to the top plate 1121. The driving unit 151 is configured for driving the mobile plate 152 to move along a height direction of the housing 110, so that the lifting plate 141 drives the lens assembly 130 for extending out of or retracting to the cover body 112 via the opening 1121*a*. Referring to FIG. 6, in this embodiment, an outer wall of one end of the guide ring 144 close to the top plate 1121 may extend from inside to outside along a circumferential direction of the guide ring 144 to form an extension portion 1441. The extension portion 1441 is located on one side of the lifting plate 141 close to the top plate 1121 and is fixedly connected to this side surface. The mobile plate 152 is sleeved on the guide ring 144 and is fixedly connected to one side of the extension portion 1441 away from the lifting plate 141. The design of the extension portion 1441 may enlarge a contact area between the guide ring 144 and the lifting plate 141 and a contact area between the guide ring 144 and the mobile plate 152, so that the lens assembly 130 is difficult to turn during retraction, which further ensures the steadiness.

In some embodiments, the driving unit 151 may be a motor, further preferably, a micro motor. Specifically, a micro linear motor may be adopted. An active cell of the motor is connected to the mobile plate 152 to directly drive the mobile plate 152 to linearly move. Or, a micro rotating motor may be adopted. An output shaft of the rotating motor is indirectly connected to the mobile plate 152 through some transmission components. The rotating motion of the output shaft of the rotating motor is converted into linear motion of the mobile plate 152, thus driving the lens assembly 130 to extend and retract.

For optimizing the size of the occupied space and reducing the cost, the driving unit 151 of the present invention is preferably the rotating motor. Specifically, in combination with FIG. 4 and FIG. 10, the driving assembly 150 further includes a transmission rod 153. One end of the transmission rod 153 is directly or indirectly connected to the output shaft of the rotating motor. One end of the mobile plate 152 away from the guide ring 144 is sleeved on the transmission rod 153 and is in threaded connection with the transmission rod 153. On end of the mobile plate 152 is provided with a bulge portion 1521 along a plane direction where the mobile plate 152 is located. A second groove 1122*a* is formed in an inner wall of the circumferential side plate 1122 along the height direction of the housing 110. The second groove 1122*a* cooperates with the bulge portion 1521 for preventing the mobile plate 152 from rotating. The rotating motion of the transmission rod 153 is converted into the linear motion of the mobile plate 152 along an axial direction of the transmission rod 153. Further, for narrowing the occupied space, a gear set 154 is adopted for transmission and direction changing. The transmission rod 153 is connected to the output shaft of the rotating motor through the gear set 154. In the present invention, no limitation is made to the number of gears in the gear set 154, and the number can be specifically designed according to the size of an internal space of the mobile phone and a requirement for the transmission accuracy.

Referring to FIG. 4 and FIG. 12, as a preference, the retractable camera module 100 further includes a sealing ring 160. An annular groove 123 is formed in the inner wall of the exterior part 120 and is configured for receiving the sealing ring 160. An inner ring of the sealing ring 160 is elastically sealed to a circumferential side surface of the optical steady motor 131. The sealing ring 160 may be a rubber sealing ring or a waterproof foam ring, or the like.

The lens assembly 130 extrudes the sealing ring 160 in both a stationary state or a motion state, so that the sealing ring 160 is sealed between the annular groove 123 and an outer peripheral surface of the optical steady motor 131, thus achieving the effect of preventing dust and water, and prolonging the service life of the lens assembly 130.

Figure 13:
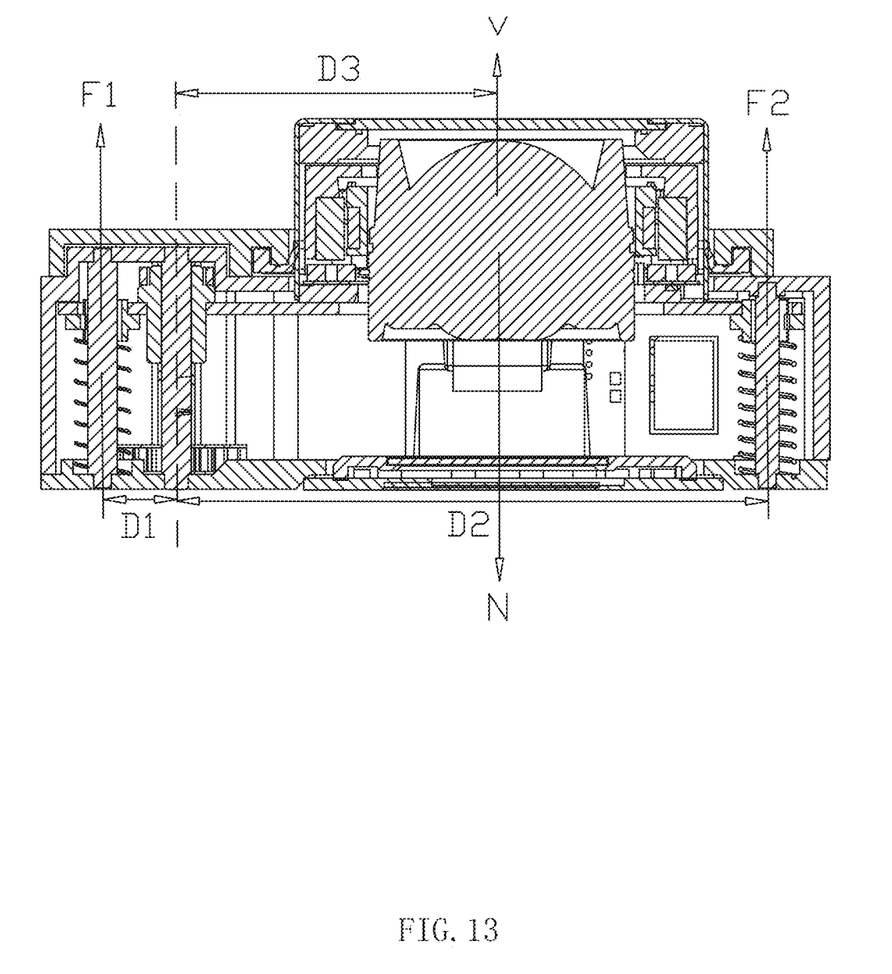
FIG. 13 is a schematic diagram of stress analysis when a lens assembly provided in an embodiment of the present invention extends farthest.
Figure 14:
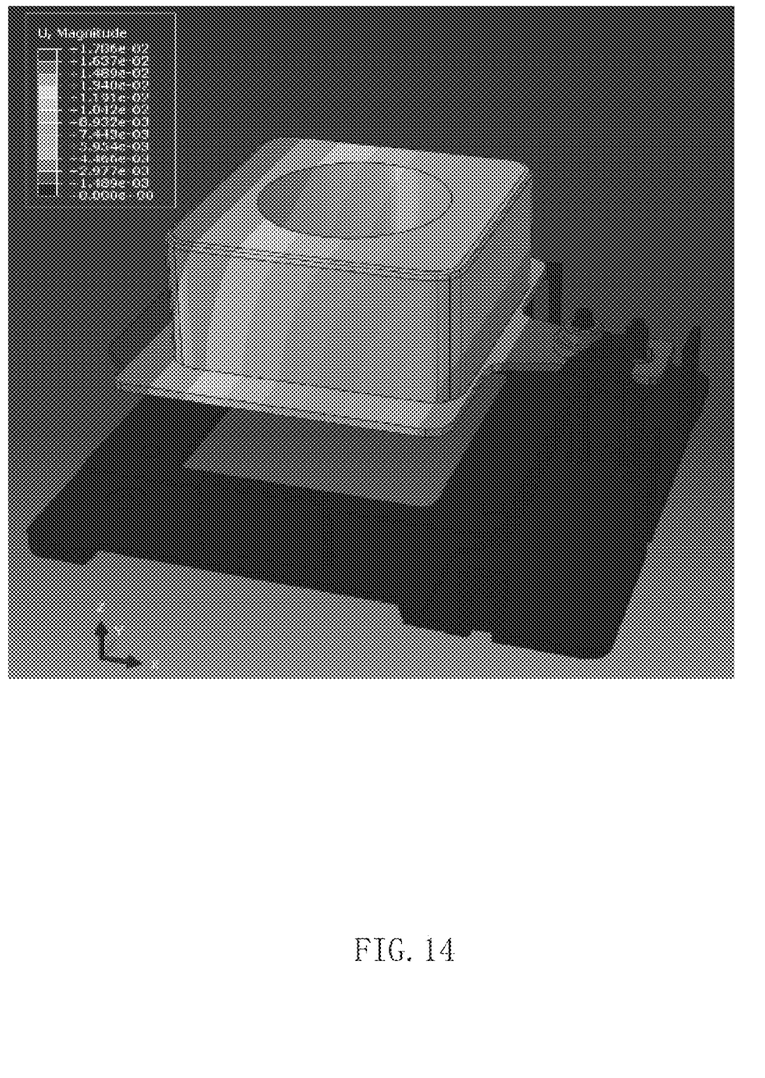
FIG. 14 is a diagram of a dynamic Tilt simulation test when a lens assembly provided in an embodiment of the present invention extends farthest.

As a preference, by adjusting the length of the elastic member 143 (i.e., the length without any external force), the material of the sealing ring 160, and distances between the guide shafts 145 and the guide rod 142, when the lens assembly 130 extends farthest, the lifting plate 141 undergoes an elastic force from the elastic members 143 and a friction force between the optical steady motor 131 and the sealing ring 160, so that the lifting plate 141 achieves a torque balanced state relative to the guide rod 142, as shown in FIG. 13, which satisfies $F1 \times D1 = F2 \times D2 - N \times D3$. As shown in FIG. 14, a simulation result shows that when the lens assembly 130 extends farthest, the dynamic Tilt is only 2.85 min (non-mechanical limit).

In combination with FIG. 6 and FIG. 8, the working principle of the retractable camera module 100 of the present invention is as follows: The driving unit 151 drives the mobile plate 152 to upwards move, and the compressed elastic members 143 enable the lifting plate 141 to overcome the frictional resistance to rise up, so the lens assembly 130 extends. The driving unit 151 drives the mobile plate 152 to downwards move, which presses the lifting plate 141 to fall down, so the lens assembly 130 retracts.

The implementation modes of the present invention are described above only. It should be noted that those of ordinary skill in the art can further make improvements without departing from the concept of the present invention. These improvements shall all fall within the protection scope of the present invention.

What is claimed is:

1. A retractable camera module, comprising:
    a housing with a receiving space;
    a lens assembly at least partially received in the housing;
    a support assembly received in the housing and configured for supporting the lens assembly; and
    a driving assembly arranged on one side of the lens assembly;
    wherein further comprising an exterior part covered on the housing, the housing comprises a bottom plate and a cover body covered on the bottom plate;
    the cover body comprises a top plate provided with an opening, and a circumferential side plate extending in a bent manner from the top plate to the bottom plate; a bulge portion is arranged on an outer wall of the top plate;
    a window corresponding to the opening in the top plate is formed in the exterior part, and a first groove matched with the bulge portion is formed in an inner wall of the exterior part;
    the support assembly comprises:
        a lifting plate connected to one side of the lens assembly close to the bottom plate;
        a guide rod penetrating through the lifting plate and fixedly connected between the bulge portion and the bottom plate; and
        at least two elastic members elastically connected between the lifting plate and the bottom plate;
    the lifting plate is fixed with a guide ring; the guide rod is slidably connected to the lifting plate through the guide ring; the at least two elastic members are distributed on two sides of the guide rod;
    the driving assembly comprises:
        a driving unit assembled to the housing; and
        a mobile plate with one end connected to the driving unit and the other end fixedly connected to the guide ring;
    the mobile plate is located on one side of the lifting plate close to the top plate; and the driving unit is configured for driving the mobile plate to move along a height direction of the housing, so that the lifting plate drives the lens assembly for extending out of or retracting to the cover body via the opening.

2. The retractable camera module according to claim 1, wherein there are two elastic members respectively located on one side of the guide rod away from the lens assembly and one side of the lens assembly away from the guide rod; and the guide rod and the two elastic members are located on one symmetry axis of the lens assembly.

3. The retractable camera module according to claim 2, wherein the support assembly further comprises guide shafts sleeved inside the elastic members, and guide sleeves sleeved on the guide shafts; the guide shafts penetrate through the lifting plate and are fixedly connected between the top plate and the bottom plate; and the guide sleeves are fixedly connected to one end of each elastic member close to the lifting plate.

4. The retractable camera module according to claim 3, wherein gaps are reserved between inner walls of each guide sleeve located on two sides of a connecting line of the two guide sleeves and each corresponding guide shaft; and inner walls of each guide sleeve located on two sides in a direction perpendicular to the connecting line of the two guide sleeves and each corresponding guide shaft are in microclearance fit.

5. The retractable camera module according to claim 1, wherein the driving assembly further comprises a transmission rod disposed along the height direction of the housing; one end of the transmission rod is connected to the driving unit; the mobile plate is sleeved on the transmission rod and is in threaded connection with the transmission rod; one end of the mobile plate is provided with a bulge portion along a plane direction where the mobile plate is located; a second groove is arranged on an inner wall of the circumferential side plate along the height direction of the housing; and the second groove is matched with the bulge portion.

6. The retractable camera module according to claim 5, wherein the driving assembly further comprises a gear set containing at least two gears; and one end of the transmission rod is connected to the driving unit through the gear set.

7. The retractable camera module according to claim 1, wherein an outer wall of one end of the guide ring close to the top plate outwardly extends along an annular direction of the guide ring to form an extension portion; the extension portion is located on one side of the lifting plate close to the top plate; and the mobile plate is sleeved on the guide ring and is fixedly connected to one side of the extension portion away from the lifting plate.

8. The retractable camera module according to claim 1, wherein an annular groove is formed in the inner wall of the exterior part; a sealing ring is fixed in the annular groove; and an inner ring of the sealing ring is elastically connected to a circumferential side surface of the lens assembly.

9. An electronic device, comprising a screen, a back cover covered on one surface of the screen, and the retractable camera module according to claim 1, wherein the retractable camera module is embedded on the back cover.

10. The electronic device according to claim 9, wherein the exterior part is covered on an outer wall of the top plate and protrudes from an outer wall of the back cover; and when the retractable camera module is in a retracted state, the lens assembly does not protrude from the outer wall of the back cover.

\* \* \* \* \*